United States Patent
Heng et al.

(10) Patent No.: US 8,252,131 B2
(45) Date of Patent: Aug. 28, 2012

(54) REWORKING CERAMIC STRUCTURES

(75) Inventors: Vann Heng, Buena Park, CA (US);
Elizabeth Chu, Mountain View, CA (US); Van H. Ngo, Westminster, CA (US); Larry D. King, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 517 days.

(21) Appl. No.: 12/497,008

(22) Filed: Jul. 2, 2009

(65) Prior Publication Data

US 2011/0003077 A1    Jan. 6, 2011

(51) Int. Cl.
*C03B 29/00* (2006.01)
*B05D 3/00* (2006.01)
(52) U.S. Cl. .................... 156/89.11; 427/294
(58) Field of Classification Search ............ 427/294; 156/89.11
See application file for complete search history.

(56) References Cited

U.S. PATENT DOCUMENTS

| | | | | |
|---|---|---|---|---|
| 5,268,338 A | * | 12/1993 | Gerberick | 501/109 |
| 5,442,156 A | * | 8/1995 | Westerman et al. | 219/243 |
| 5,928,448 A | * | 7/1999 | Daws | 156/98 |
| 6,013,592 A | * | 1/2000 | Merrill et al. | 501/80 |
| 6,355,203 B1 | * | 3/2002 | Charmes et al. | 264/493 |
| 6,385,836 B1 | * | 5/2002 | Coltrin | 29/402.18 |
| 6,617,013 B2 | * | 9/2003 | Morrison et al. | 428/293.4 |
| 6,733,907 B2 | * | 5/2004 | Morrison et al. | 428/699 |
| 2006/0234579 A1 | * | 10/2006 | Adam et al. | 442/136 |
| 2009/0044896 A1 | | 2/2009 | Adam et al. | |

* cited by examiner

*Primary Examiner* — Philip Tucker
*Assistant Examiner* — Alex Efta
(74) *Attorney, Agent, or Firm* — Yee & Associates, P.C.

(57) ABSTRACT

A method for reworking a ceramic structure. A number of holes are formed in a portion of the ceramic structure in which a rework of the ceramic structure is desired. The ceramic structure has a plurality of layers in the portion in which the rework is desired. A ceramic bonding material is introduced into the number of holes formed in the portion of the ceramic structure. The ceramic bonding material is cured in the portion of the ceramic structure.

16 Claims, 15 Drawing Sheets

REWORKING CERAMIC STRUCTURES

BACKGROUND INFORMATION

1. Field

The present disclosure relates generally to ceramic materials and, in particular, to structures containing multiple layers of ceramic materials. Still more particularly, the present disclosure relates to repairing structures with ceramic materials.

2. Background

Various types of vehicles require thermal resistance or thermal protection systems during operation of the vehicles. For example, some of the exterior surfaces of spacecraft require a capability to withstand high temperatures that may be encountered during re-entry of the spacecraft into the atmosphere. As another example, jet engines, rocket engines, and power generators also have surfaces that are required to be capable of withstanding the operating temperatures that occur during the use of engines and generators.

With the surfaces of spacecraft, tiles may be added to the surfaces as part of a thermal protection system. These ceramic tiles may take the form of a ceramic substrate with a facesheet that has been wrapped around and bonded or cured to the ceramic substrate. This facesheet may comprise a number of different layers of materials. These materials may include, for example, without limitation, a ceramic matrix composite material. These and other ceramic structures may contain layers of ceramic matrix composite materials.

A ceramic matrix composite material may be, for example, a material consisting of two or more components. A ceramic matrix is typically the principle component with additional components being incorporated to strengthen, toughen, and/or enhance thermal physical properties.

Layers of ceramic matrix composite materials also may be used in various components. These components include, for example, a nozzle or combustion chamber for an engine or generator.

During manufacturing and/or use of parts comprised of or including ceramic matrix composite materials, inconsistencies may occur with respect to those parts. These inconsistencies include, for example, plies delaminating, the facesheet de-bonding from the substrate, or other types of inconsistencies.

Currently, these inconsistencies may require reworking to restore the vehicle or structure to a desired level of operation.

These types of parts are currently reworked by replacing the parts. In other words, the part containing the inconsistency is removed. A new part is put in place of the old part. This type of replacement is costly and time consuming. Parts containing ceramic matrix composite materials may be expensive in addition to the replacement being time consuming. Also, the needed parts may not be on hand or may need to be specially manufactured by a third party. Further, the performance of the vehicle may be limited or reduced until the replacement can be made.

Therefore, it would be advantageous to have a method and apparatus that takes into account at least some of the issues discussed above, as well as possibly other issues.

SUMMARY

In one advantageous embodiment, a method is present for reworking a ceramic structure. A number of holes are formed in a portion of the ceramic structure in which a rework of the ceramic structure is desired. The ceramic structure has a plurality of layers in the portion in which the rework is desired. A ceramic bonding material is introduced into the number of holes formed in the portion of the ceramic structure. The ceramic bonding material is cured in the portion of the ceramic structure.

In another advantageous embodiment, a method is present for reworking a ceramic structure. A number of holes are formed in a portion of the ceramic structure in which a rework of the ceramic structure is desired. The ceramic structure has a plurality of layers formed from a ceramic matrix composite material. A vacuum bag with an opening is placed over the portion of the ceramic structure in which the number of holes is exposed in the opening. The number of holes exposed in the opening is covered with a tape. A vacuum is applied to the portion through the vacuum bag. A ceramic bonding material is introduced through the tape into the number of holes formed in the portion of the ceramic structure while the vacuum is being applied. The ceramic bonding material is cured in the portion of the ceramic structure for a period of time after the ceramic bonding material has been introduced into the number of holes while the vacuum is being applied.

In yet another advantageous embodiment, a method is present for reworking a ceramic structure. Holes are formed in a portion of the ceramic structure in which a rework of the ceramic structure is desired. The ceramic structure has a plurality of layers formed from a ceramic matrix composite material. A vacuum bag is placed over the portion of the ceramic structure in which the vacuum bag has an opening exposing a subset of the holes. The subset of the holes exposed in the opening is covered with a tape. A vacuum is applied to the portion through the vacuum bag. A ceramic bonding material is introduced through the tape into the subset of the holes while the vacuum is being applied. The ceramic bonding material is heated in the portion of the ceramic structure for a period of time after the ceramic bonding material has been introduced into the holes while the vacuum is being applied. The steps of placing the vacuum bag over the portion of the ceramic structure in which the vacuum bag has an opening exposing the subset of the holes, covering the subset of the holes with the tape, applying the vacuum to the portion through the vacuum bag, introducing the ceramic bonding material through the tape into the subset of the holes while the vacuum is being applied, and heating the ceramic bonding material in the portion of the ceramic structure for the period of time after the ceramic bonding material has been introduced into the subset of the holes while the vacuum is being applied are repeated for a different subset of the holes until all of the holes have been processed.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
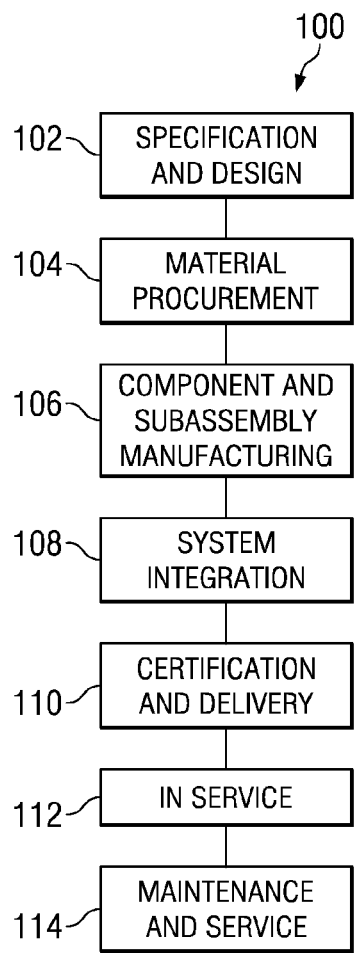
FIG. 1 is a diagram illustrating a spacecraft manufacturing and service method in accordance with an advantageous embodiment.
Figure 2:
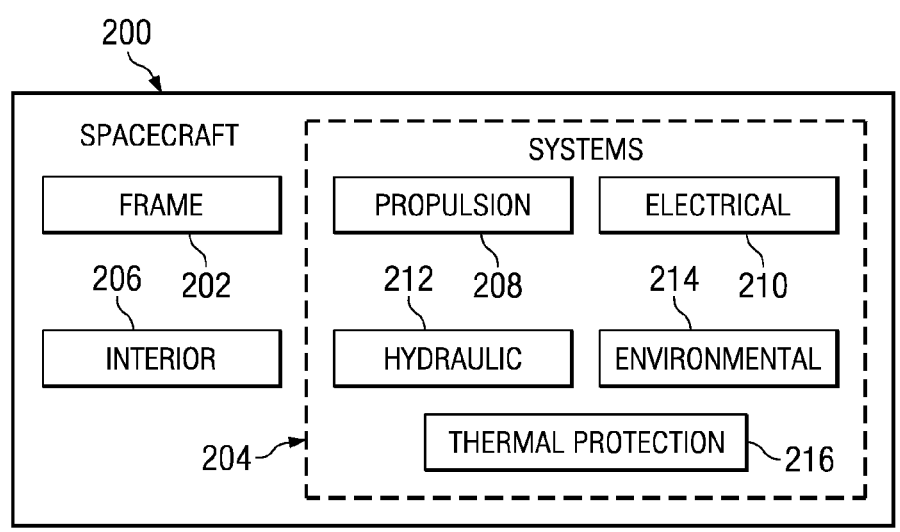
FIG. 2 is a diagram of a spacecraft in which an advantageous embodiment may be implemented.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, a diagram illustrating a spacecraft manufacturing and service method is depicted in accordance with an advantageous embodiment.

During pre-production, spacecraft manufacturing and service method 100 may include specification and design 102 of spacecraft 200 in FIG. 2 and material procurement 104. During production, component and subassembly manufacturing 106 and system integration 108 of spacecraft 200 in FIG. 2 takes place. Thereafter, spacecraft 200 in FIG. 2 may go through certification and delivery 110 in order to be placed in service 112.

While in service by a customer, spacecraft 200 in FIG. 2 is scheduled for routine maintenance and service 114, which may include modification, reconfiguration, refurbishment, and other maintenance or service. In this example, spacecraft manufacturing service method 100 is shown as a commercial method for spacecraft. The different advantageous embodiments may be applied to other types of manufacturing, including government spacecraft, and even other types of vehicles and/or platforms.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of venders, subcontractors, and suppliers; and an operator may be a company, a military entity, a service organization, and so on.

With reference now to FIG. 2, a diagram of a spacecraft is depicted in which an advantageous embodiment may be implemented. In this illustrative example, spacecraft 200 is produced by spacecraft manufacturing and service method 100 in FIG. 1. Spacecraft 200 may include frame 202 with a plurality of systems 204 and interior 206.

Examples of plurality of systems 204 include one or more of propulsion system 208, electrical system 210, hydraulic system 212, environmental system 214, and thermal protection system 216. Although an aerospace example is shown, different advantageous embodiments may be applied to other industries, such as the automotive industry.

Apparatus and methods embodied herein may be employed during at least one of the stages of spacecraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while spacecraft 200 is in service 112 in FIG. 1.

As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while spacecraft 200 is in service 112 and/or during maintenance and service 114 in FIG. 1.

The use of a number of the different advantageous embodiments may substantially expedite the assembly of and/or reduce the cost of spacecraft 200. For example, one or more of the different advantageous embodiments may be used during component and subassembly manufacturing 106 and/or system integration 108. The different advantageous embodiments may be used during these parts of spacecraft manufacturing and service method 100 to rework ceramic structures that may have undesired inconsistencies.

Further, the different advantageous embodiments also may be implemented during in service 112 and/or maintenance and service 114 to rework inconsistencies that may be discovered in ceramic structures that may be present in spacecraft 200. By allowing rework rather than replacement, the cost of new parts may be reduced and/or eliminated. Also, through reworking ceramic structures, one or more of the different advantageous embodiments may allow for spacecraft 200 to continue operation with a desired level of performance more quickly as compared to waiting for a replacement part.

The different advantageous embodiments recognize and take into account a number of different considerations. For example, the different advantageous embodiments recognize and take into account that when the rework involves an inconsistency in the form of a gouge, ceramic materials may be placed into and bonded into this type of inconsistency.

The different advantageous embodiments recognize and take into account that the process used to rework gouges is typically unsuitable for reworking an inconsistency in which a layer within the ceramic structure becomes detached or disassociated from another layer within a ceramic structure. This detachment or dissociation is referred to as delamination.

For example, when a delamination occurs between layers in a facesheet or the facesheet de-bonds from the substrate in a ceramic structure containing ceramic matrix composite materials, reworking the ceramic structure may be unfeasible. The ceramic structure with this delamination is scrapped or discarded.

Thus, the different advantageous embodiments provide a method for reworking a ceramic structure. A number of holes are formed in a portion of the ceramic structure in which a rework of the ceramic structure is desired. The ceramic structure has a plurality of layers in the portion in which the rework is desired. A ceramic bonding material is introduced into the number of holes formed in the portion of the ceramic structure. The ceramic bonding material is cured in the portion of the ceramic structure.

In this manner, the different advantageous embodiments provide a method for reworking inconsistencies. In particular, the different advantageous embodiments may be applied to a delamination in a ceramic structure.

With one or more of the different advantageous embodiments, reworking of a ceramic structure may be performed more quickly and/or for a lower cost. The different advantageous embodiments may use low-cost materials as compared to those used in patching a ceramic structure containing ceramic matrix composite materials. These materials may be costly. Further, the different advantageous embodiments may be used for repairs of parts on a vehicle, as well as during manufacturing of parts.

Figure 3:
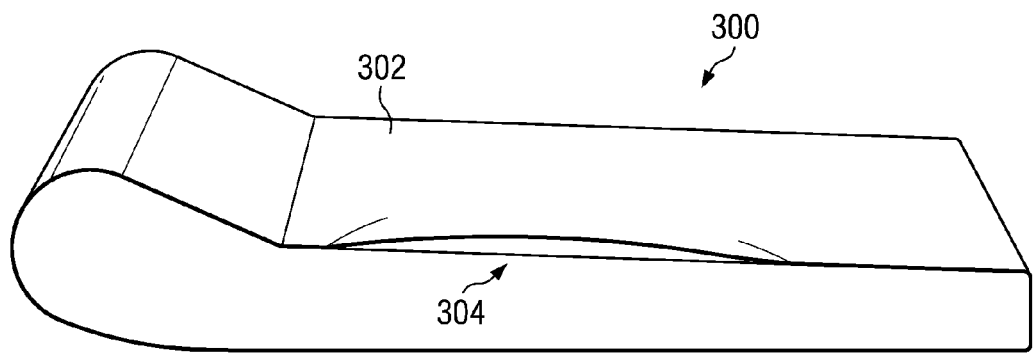
FIG. 3 is an illustration of a part with an inconsistency in accordance with an advantageous embodiment.

With reference now to FIG. 3, an illustration of a part with an inconsistency is depicted in accordance with an advantageous embodiment. In this illustrative example, part 300 is a ceramic structure in the form of ceramic matrix composite tile 302. Ceramic matrix composite tile 302 is illustrated in a cross-sectional view. As depicted in this example, ceramic matrix composite tile 302 has inconsistency 304. Inconsistency 304 is a delamination of ceramic matrix composite tile 302 that requires rework in this illustrative example.

Figure 4:
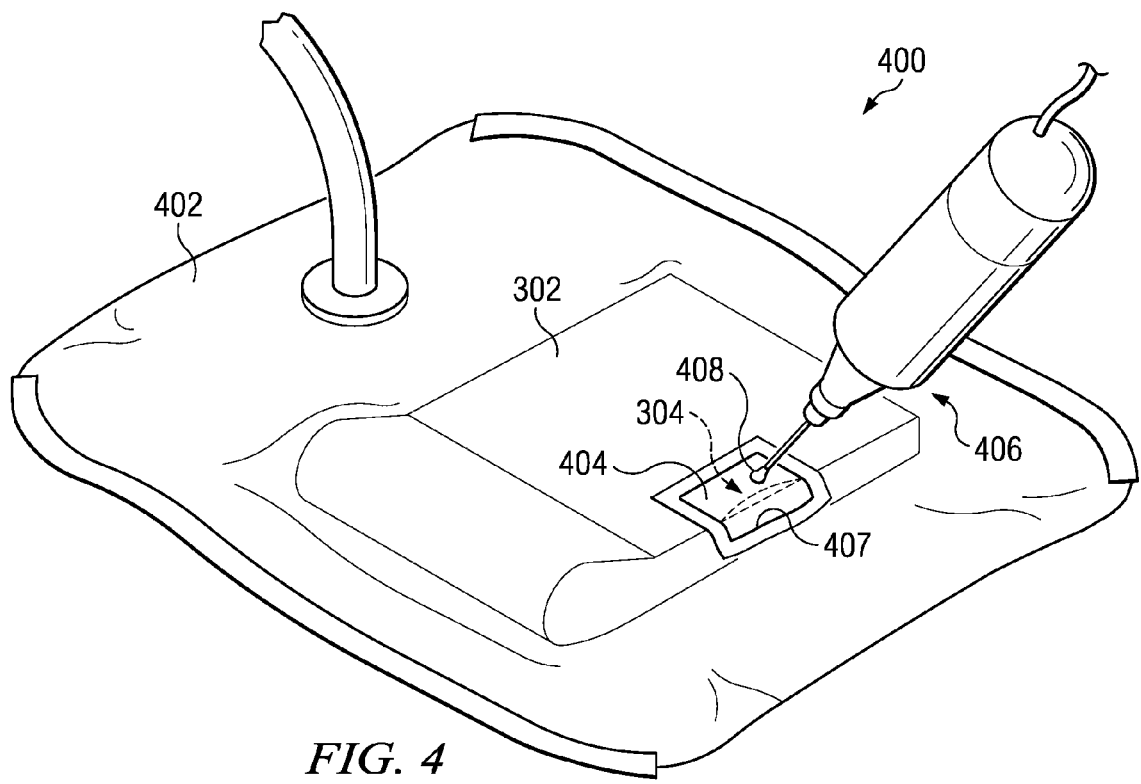
FIG. 4 is an illustration of a setup for reworking an inconsistency in accordance with an advantageous embodiment.

In FIG. 4, an illustration of a setup for reworking an inconsistency is depicted in accordance with an advantageous embodiment. In this illustrative example, setup 400 is used to rework inconsistency 304 in ceramic matrix composite tile 302.

In this illustrative example, setup 400 is an example of a setup that may be used to rework inconsistency 304.

In this portion of the rework process example, setup 400 includes vacuum bag 402, tape 404, and injection system 406. Vacuum bag 402 has opening 407.

Vacuum bag 402 is placed over the surface in which holes have been formed in the portion of ceramic matrix composite tile 302 where inconsistency 304 is located. The edges of vacuum bag 402 are taped. Opening 407 in vacuum bag 402 exposes holes formed on the surface of ceramic matrix composite tile 302 where inconsistency 304 is located. Tape 404 covers the holes exposed in opening 407.

Injection system 406 injects ceramic bonding material 408 into the holes exposed by opening 407. The injection of ceramic bonding material 408 occurs at the same time as a vacuum is applied using vacuum bag 402 in this illustrative example.

Figure 5:
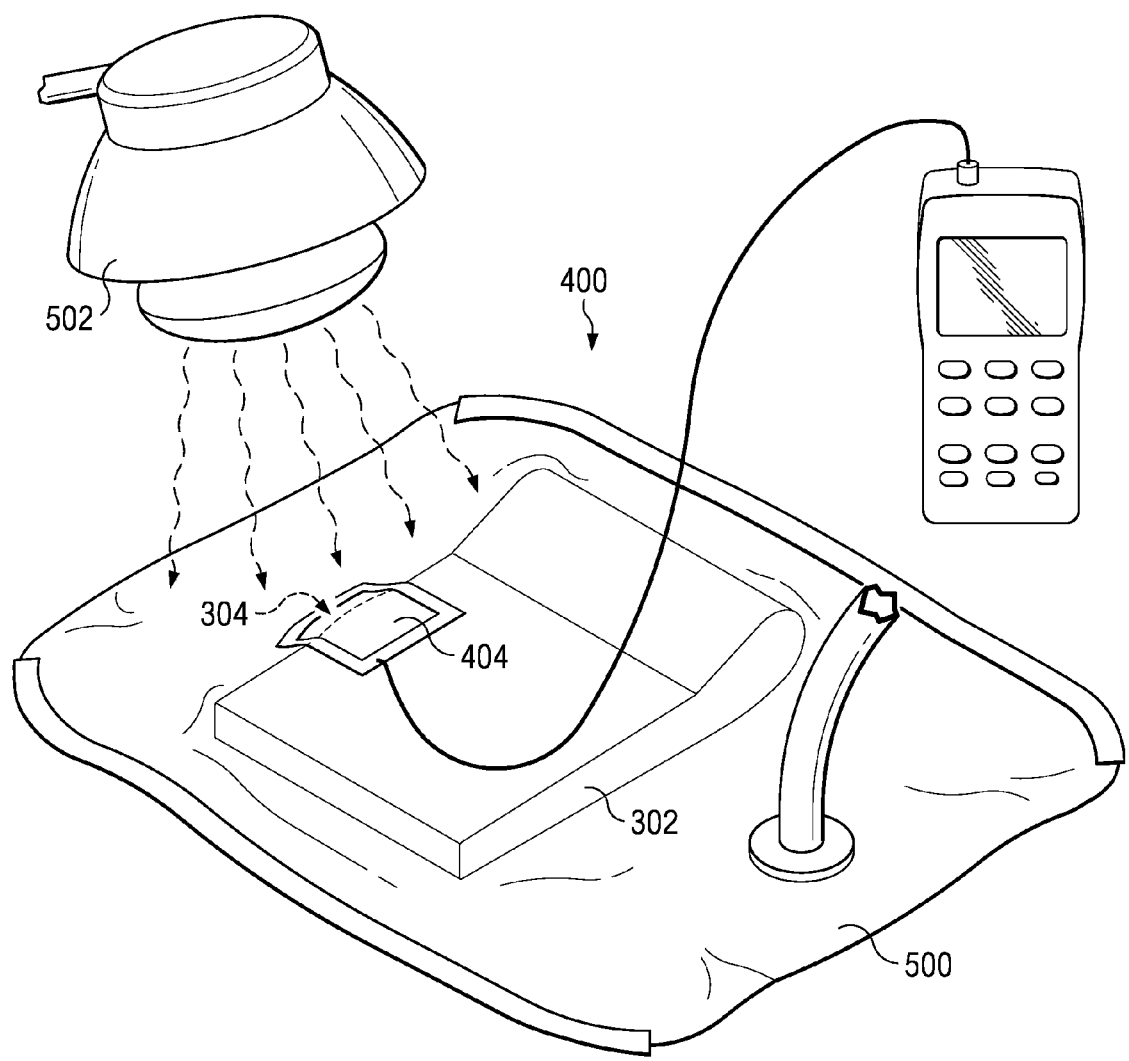
FIG. 5 is an illustration of a setup for reworking an inconsistency in accordance with an advantageous embodiment.

With reference now to FIG. 5, an illustration of a setup for reworking an inconsistency is depicted in accordance with an advantageous embodiment. In this portion of the process of reworking the inconsistency, setup 400 also includes vacuum bag 500 and heat lamp 502. Vacuum bag 500 replaces vacuum bag 402 in FIG. 4. Vacuum bag 500 encloses ceramic matrix composite tile 302. In other words, vacuum bag 500 does not have an opening, such as opening 407 for vacuum bag 402 in FIG. 4.

Heat lamp 502 generates heat that cures the ceramic bonding material placed into ceramic matrix composite tile 302. Heat lamp 502 applies heat while a vacuum is applied using vacuum bag 500. In this manner, ceramic bonding material 408 in FIG. 4 in ceramic matrix composite tile 302 is cured.

Figure 6:
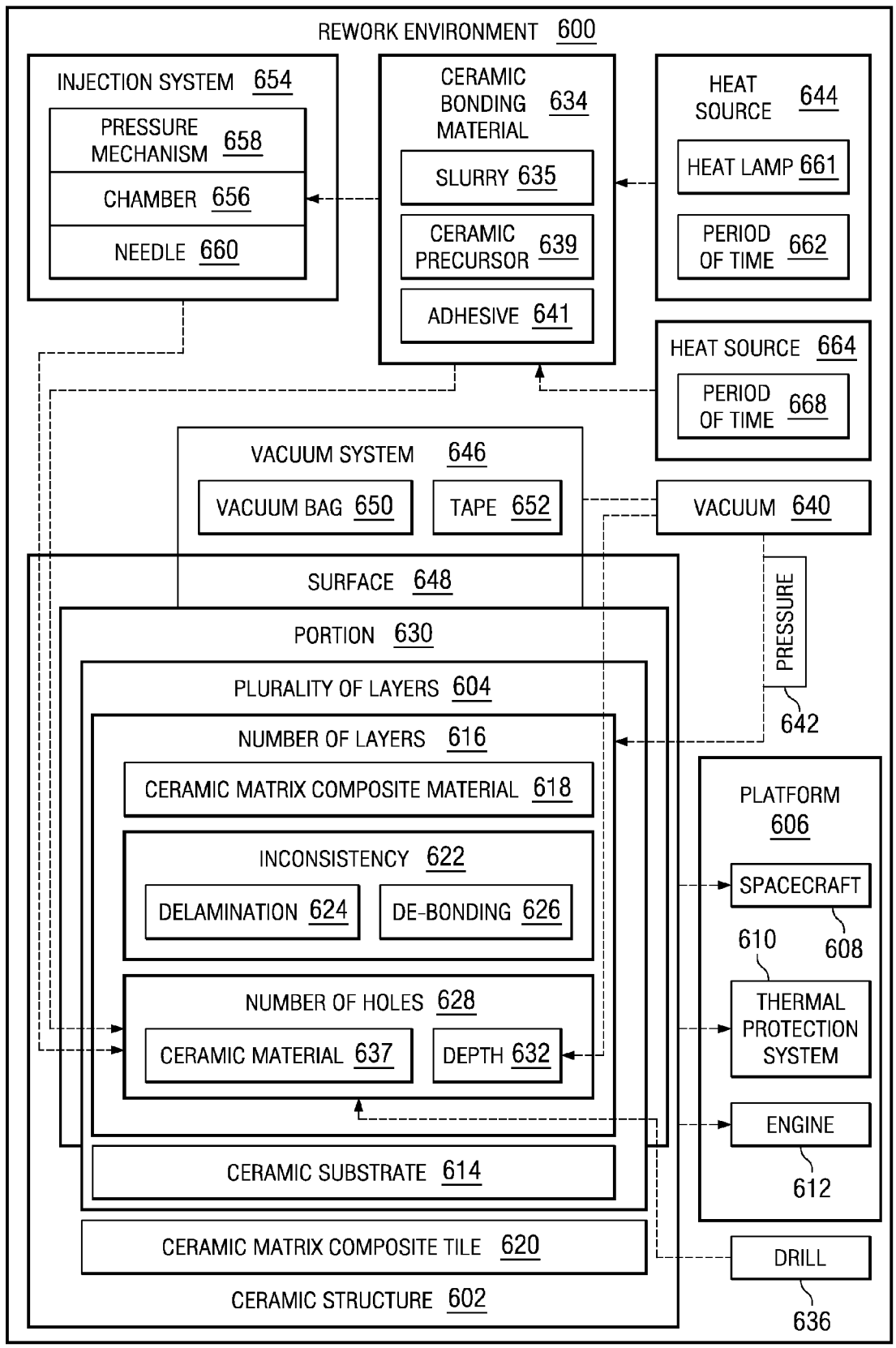
FIG. 6 is a diagram of a rework environment in accordance with an advantageous embodiment.

Turning now to FIG. 6, a diagram of a rework environment is depicted in accordance with an advantageous embodiment. Rework environment 600 in FIG. 6 may be used during the manufacturing and/or maintenance of a platform, such as spacecraft 200 in FIG. 2.

In this illustrative example, ceramic structure 602 may have plurality of layers 604. Ceramic structure 602 may be located on platform 606, which may take the form of spacecraft 608. In these illustrative examples, ceramic structure 602 may be located in different portions of spacecraft 608. For example, without limitation, ceramic structure 602 may be present in thermal protection system 610, engine 612, and/or in other suitable structures within spacecraft 608.

In these illustrative examples, plurality of layers 604 in ceramic structure 602 may include ceramic substrate 614 and number of layers 616. Number of layers 616 may be located over or around ceramic substrate 614.

In these illustrative examples, number of layers 616 may include ceramic matrix composite material 618. As a specific example, ceramic structure 602 may take the form of ceramic matrix composite tile 620 in which number of layers 616 may form a facesheet that is bonded to ceramic substrate 614.

In these illustrative examples, delamination 624 may occur between layers within number of layers 616. Further, de-bonding 626 of number of layers 616 from ceramic substrate 614 also may occur. With this or any other type of separation of layers within plurality of layers 604, inconsistency 622 may be reworked using one or more of the advantageous embodiments to reduce and/or eliminate inconsistency 622.

In these illustrative examples, the rework is performed by forming number of holes 628 within portion 630 of ceramic structure 602 in which a rework of ceramic structure 602 is desired. In these illustrative examples, number of holes 628 is formed using drill 636. Of course, any tool capable of forming number of holes 628 may be used. Number of holes 628 may have depth 632. Depth 632 may be a depth that extends through part or all of portion 630 in these examples.

Ceramic bonding material 634 is introduced into number of holes 628 and in portion 630 of ceramic structure 602. In the depicted examples, portion 630 may be a three-dimensional volume containing inconsistency 622. Thereafter, ceramic bonding material 634 is cured.

Ceramic bonding material 634 may be any material capable of being cured to form ceramic material 637. For example, ceramic bonding material 634 may be at least one of ceramic precursor 639, adhesive 641, and other suitable materials. Ceramic precursor 639 contains a number of organometallic compounds. These compounds transform into ceramic material 637 through a curing process. Adhesive 641 contains ceramic particles suspended in liquid. When cured, adhesive 641 also forms ceramic material 637. In these examples, ceramic precursor 639 also may be suspended in a liquid in the form of slurry 635. A slurry is a liquid in which components may be suspended.

In one or more of the advantageous embodiments, ceramic bonding material 634 may be introduced into number of holes 628 under vacuum 640. Vacuum 640 generates pressure 642 on number of layers 616 in a manner such that number of layers 616 is pushed up against ceramic substrate 614. Additionally, vacuum 640 also may generate pressure on number of layers 616 in a manner such that number of layers 616 is pushed against each other.

Pressure 642 may place number of layers 616 in a position relative to each other or with respect to ceramic substrate 614. As a result, when ceramic bonding material 634 is cured, these different components may be in a desired position within ceramic structure 602.

When ceramic substrate 614 is not present, number of layers 616 may be pushed against each other to provide a desired position for those layers within ceramic structure 602. After ceramic bonding material 634 has been introduced into number of holes 628, ceramic bonding material 634 may be cured with the different components in a desired position using heat source 644.

In the different advantageous embodiments, vacuum 640 may be introduced onto ceramic structure 602 in a manner that pushes number of layers 616 against each other and/or against ceramic substrate 614 using vacuum system 646. Vacuum system 646 may be placed onto surface 648 around portion 630 of ceramic structure 602. Further, ceramic bonding material 634 may be introduced into number of holes 628. In these illustrative examples, vacuum system 646 may take the form of vacuum bag 650 and/or tape 652.

In the illustrative examples, ceramic bonding material 634 may be introduced through vacuum system 646 using injection system 654. Injection system 654 may include chamber 656, pressure mechanism 658, and needle 660. Ceramic bonding material 634 is located in chamber 656 in these examples. Pressure mechanism 658 generates pressure in chamber 656 to cause ceramic bonding material 634 to flow through needle 660. Needle 660 may puncture or penetrate vacuum system 646 and enter a hole in number of holes 628. At this point, ceramic bonding material 634 may be introduced into a hole in number of holes 628.

As ceramic bonding material 634 is introduced into number of holes 628, ceramic bonding material 634 spreads to different parts of portion 630 in which inconsistency 622 is present. For example, ceramic bonding material 634 may spread from number of holes 628 into locations where delamination 624, de-bonding 626, and other inconsistencies may be present.

In these illustrative examples, curing is performed using heat source 644. In this example, heat source 644 may take the form of heat lamp 661. Curing is performed using heat source 644 for period of time 662. In these illustrative examples, heat source 644 may be, for example, without limitation, a heated blanket, a heat lamp, and/or some other suitable type of heat source. Ceramic bonding material 634 may form ceramic material 637 within number of holes 628. Further, ceramic bonding material 634 also may enter areas in portion 630 in which inconsistency 622 is present. For example, if delamination 624 is present, ceramic bonding material 634 may enter spaces between number of layers 616 in which delamination 624 has occurred.

In these illustrative examples, ceramic bonding material 634 may be cured a second time to fully cure all of ceramic bonding material 634. Another heat source, such as heat source 664, may be used to finish curing ceramic bonding material 634. Heat source 664 is applied for period of time 668.

In this illustrative example, if the rework is being performed in the field while platform 606 is being operated, heat source 664 may be located on platform 606. For example, without limitation, heat source 664 may be an engine of an aircraft. In this manner, reworking of ceramic structure 602 may be performed without removing ceramic structure 602 from platform 606. If the rework is being performed on a part in a manufacturing or maintenance facility, heat source 664 may take the form of an oven or autoclave.

In this manner, ceramic bonding material 634 acts as adhesive 641. In other words, when ceramic bonding material 634 is cured, ceramic bonding material 634 may bond layers within number of layers 616 to each other in which delamination 624 has occurred. Further, ceramic bonding material 634 may bond number of layers 616 to ceramic substrate 614 when de-bonding 626 has occurred between number of layers 616 and ceramic substrate 614.

The illustration of rework environment 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, only a single curing step may be needed. In yet other advantageous embodiments, a vacuum may only be applied during the curing step and not while ceramic bonding material 634 is introduced into number of holes 628.

As yet another example, in one or more advantageous embodiments, vacuum system 646 also may include a caul plate, which may be placed over the surface after ceramic bonding material 634 has been placed into portion 630 of ceramic structure 602 through number of holes 628.

With reference now to FIGS. 7-12, diagrams illustrating reworking of a ceramic structure are depicted in accordance with an advantageous embodiment. The processes illustrated in FIGS. 7-12 may be applied to inconsistencies in an area less than or equal to around a three inch by three inch area.

Figure 7:
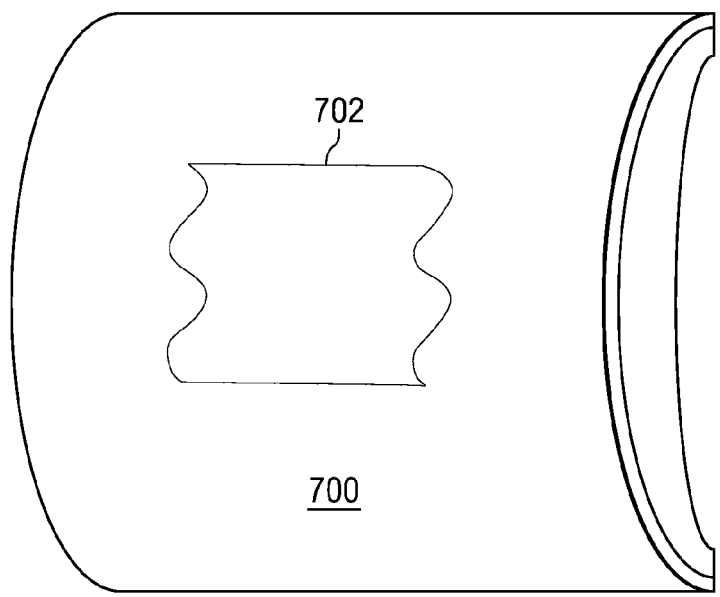
FIG. 7 is a diagram of a ceramic structure with an inconsistency in accordance with an advantageous embodiment.

Turning first to FIG. 7, a diagram of a ceramic structure with an inconsistency is depicted in accordance with an advantageous embodiment. In this illustrative example, ceramic structure 700 may have inconsistency 702. Ceramic structure 700 includes a ceramic substrate with a number of layers forming a facesheet. Inconsistency 702 is a delamination of the number of layers and/or a de-bonding of the number of layers from the substrate in this illustrative example. Of course, other types of inconsistencies may be reworked in these examples.

Figure 8:
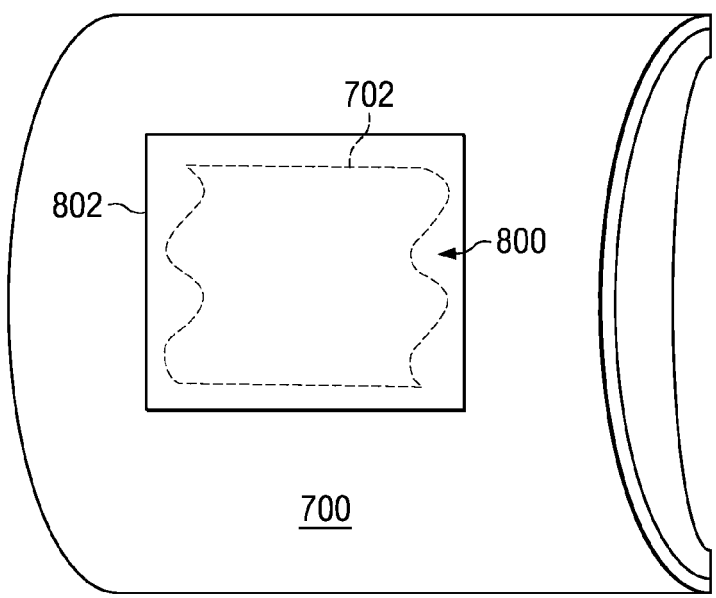
FIG. 8 is a diagram illustrating masking of a ceramic structure in accordance with an advantageous embodiment.

With reference next to FIG. 8, a diagram illustrating taping of a ceramic structure is depicted in accordance with an advantageous embodiment. In FIG. 8, area 800 has been covered with tape 802. Area 800 is an area encompassing inconsistency 702 in these examples. Tape 802 may be, for example, a non-porous release tape commonly used in manufacturing composite components.

Figure 9:
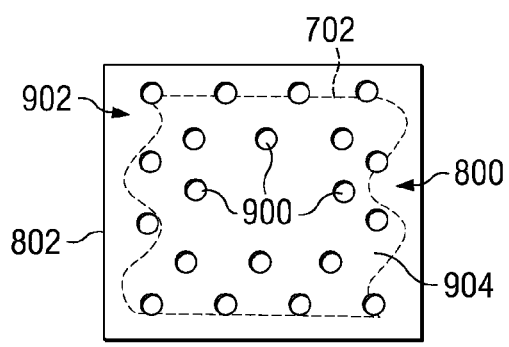
FIG. 9 is a diagram illustrating preparing an area for rework in accordance with an advantageous embodiment.

Turning now to FIG. 9, a diagram illustrating preparing an area for rework is depicted in accordance with an advantageous embodiment. In this example, number of holes 900 has been drilled through tape 802 into portion 902 of ceramic structure 700 with inconsistency 702 inside area 800. Portion 902 is a three-dimensional volume containing inconsistency 702.

In these examples, tape 802 may be used to outline a grid for drilling number of holes 900. In other examples, number of holes 900 may be drilled without the use of tape 802. In still other examples, tape 802 may have some amount of transparency. This transparency may allow inconsistency 702 to be viewed through tape 802.

In these illustrative examples, each hole in number of holes 900 may have a diameter from around 0.03 inches to around 0.50 inches. Each of the holes may be spaced apart from each other using staggered spacing. This spacing may be, for example, around 0.50 inches to around 1.00 inch. In these illustrative examples, number of holes 900 may be within and around the periphery of surface 904 of inconsistency 702. In these examples, number of holes 900 may be drilled through tape 802.

Figure 10:
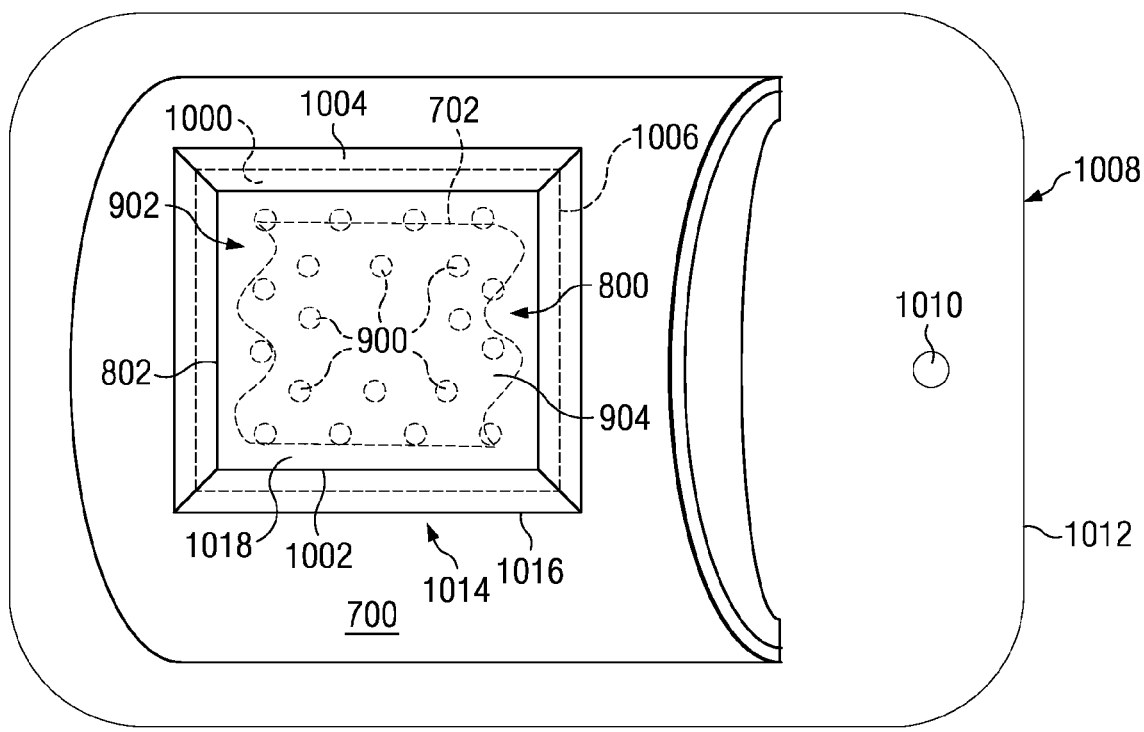
FIG. 10 is a diagram illustrating preparing an inconsistency for introduction of a ceramic bonding material in accordance with an advantageous embodiment.

Turning next to FIG. 10, a diagram illustrating preparing an inconsistency for introduction of a ceramic bonding material is depicted in accordance with an advantageous embodiment. In this example, breather material 1000 is placed around edges 1002 of area 800. Breather material 1000 may be, for example, without limitation, a cloth or some other suitable fabric capable of absorbing a ceramic bonding material.

Tape 1004 is then placed over and around breather material 1000 to seal edges 1006 of breather material 1000. Thereafter, vacuum bag 1008 is placed onto surface 904. Vacuum bag 1008 includes vacuum port 1010. Further, edges 1012 of vacuum bag 1008 are secured to surface 904. Vacuum bag 1008 has opening 1014 with edges 1016. When vacuum bag 1008 is placed onto surface 904, number of holes 900 is exposed through opening 1014.

Tape 1018 is then placed over opening 1014 and covers number of holes 900 in these examples. Tape 1018 may be the same type of tape as tape 802. In these illustrative examples, tape 1018 may have substantially the same size as opening 1014. In other words, tape 1018 may be a single piece or strip with substantially the same size as opening 1014. In other illustrative examples, tape 1018 may be strips that have a size smaller than opening 1014. These strips are placed to cover number of holes 900. A vacuum is drawn on vacuum bag 1008. This vacuum may be from around 5 inches Hg to around 10 inches Hg.

Figure 11:
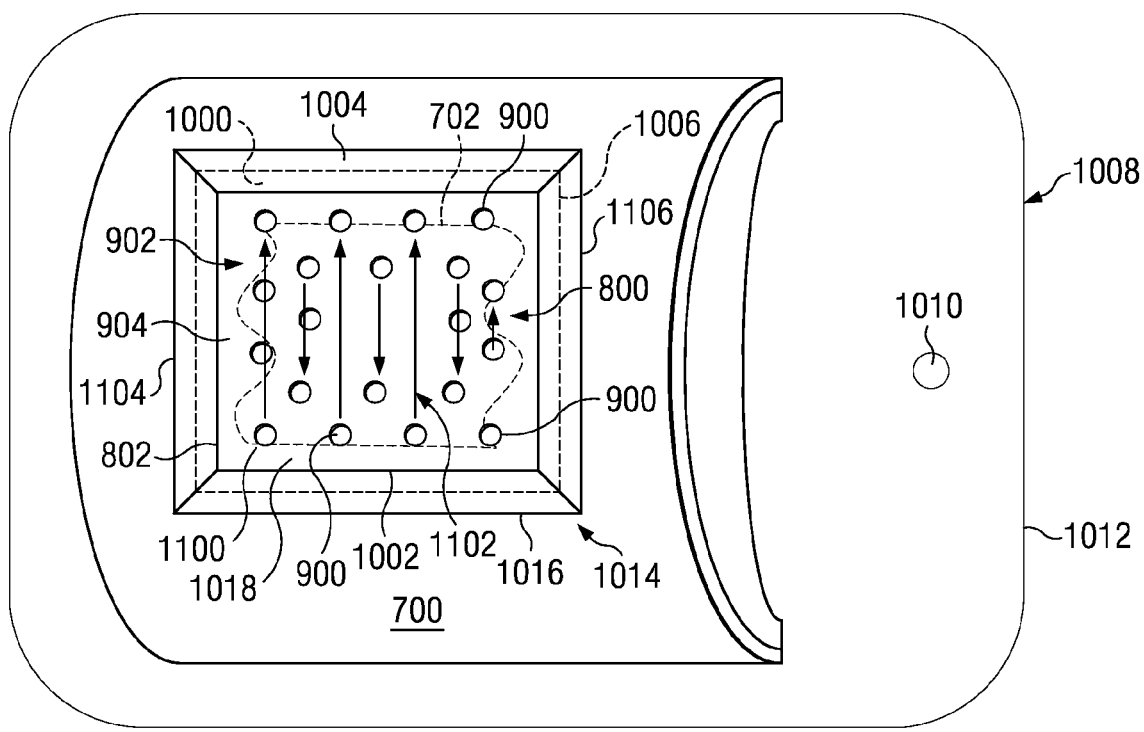
FIG. 11 is a diagram illustrating introduction of a ceramic bonding material into holes within an inconsistency in accordance with an advantageous embodiment.

Turning now to FIG. 11, a diagram illustrating introduction of a ceramic bonding material into holes within an inconsistency is depicted in accordance with an advantageous embodiment. In this illustrative example, a ceramic bonding material is introduced into number of holes 900. The ceramic bonding material may be introduced by puncturing tape 1018 and injecting the ceramic bonding material into each hole. The ceramic bonding material may be introduced in any sequence desired.

In this illustrative example, the ceramic bonding material may be introduced at point 1100, which is a point farthest away from vacuum port 1010. The introduction of the ceramic bonding material is introduced in the holes in a sequence as indicated by arrows 1102 moving from side 1104 to side 1106. The introduction of the ceramic bonding material occurs, while the vacuum is drawn on vacuum bag 1008. In other words, the vacuum is drawn on vacuum bag 1008 while the ceramic bonding material is introduced.

Figure 12:
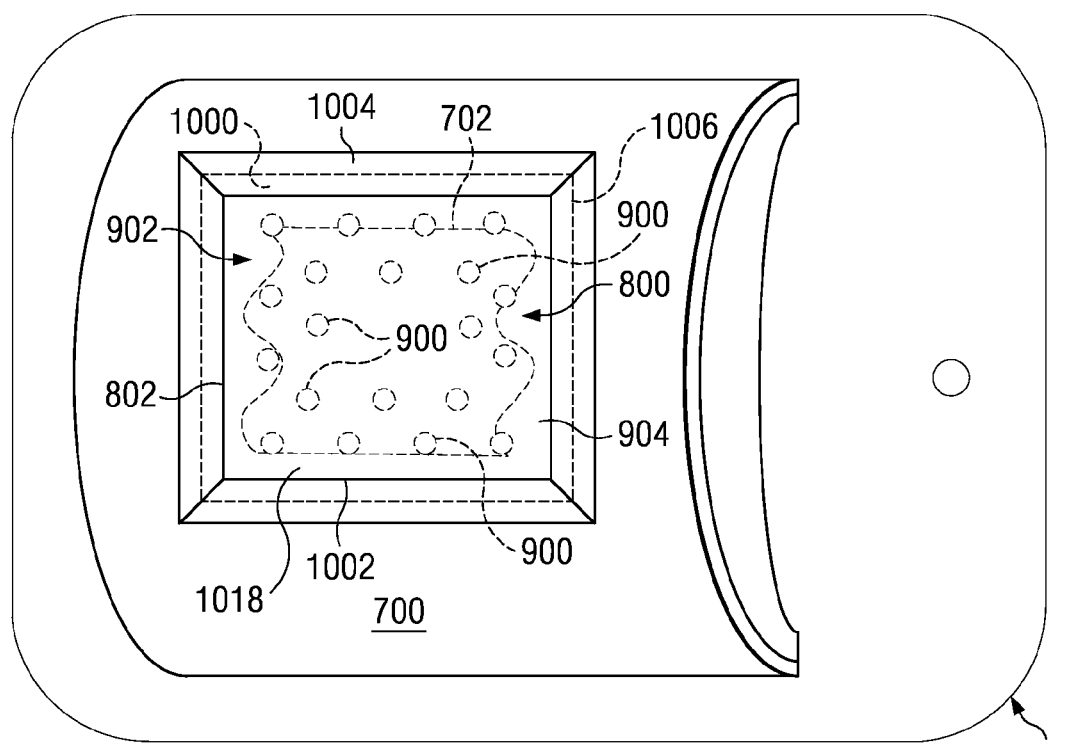
FIG. 12 is a diagram illustrating curing of an inconsistency with a ceramic bonding material in accordance with an advantageous embodiment.

Turning now to FIG. 12, a diagram illustrating curing of an inconsistency with a ceramic bonding material is depicted in accordance with an advantageous embodiment. In this illustrative example, vacuum bag 1008 with opening 1014 has been removed, and vacuum bag 1200 is put in place over inconsistency 702 with the ceramic bonding material introduced into portion 902. Vacuum bag 1200 fully encloses inconsistency 702 in this example. Further vacuum bag 1200 fully encloses ceramic structure 700.

The second vacuum bag, vacuum bag 1200, is used in place of the first vacuum bag, vacuum bag 1008, to provide a fully enclosed vacuum setup. Tape 1018 is not removed in these examples. Tape 1018 may be used for curing and may stand up to the heat applied during curing. However, the first vacuum bag may only provide a partial vacuum in these examples. The second vacuum bag provides a higher amount of vacuum that may be desired or needed. Of course, depending on the particular implementation, the second vacuum bag may be omitted and the first vacuum bag and tape can be used for curing.

Thereafter, a vacuum may be applied to vacuum bag 1200. Heat may then be applied. This heat may be applied using a heat source, such as a heat lamp, heat blanket, or some other suitable component.

Turning now to FIGS. 13-18, diagrams illustrating reworking of a ceramic structure are depicted in accordance with an advantageous embodiment. The different processes illustrated in FIGS. 13-18 may be applied to reworking inconsistencies in an area greater than around three inches by three inches.

Figure 13:
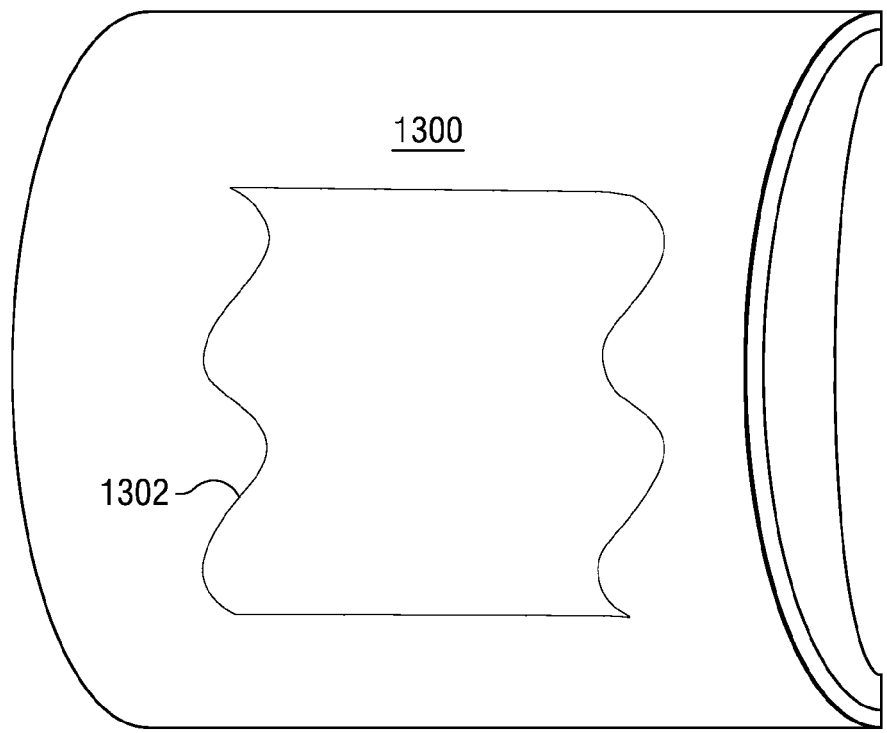
FIG. 13 is a diagram of a ceramic structure with an inconsistency in accordance with an advantageous embodiment.

With reference first to FIG. 13, a diagram of a ceramic structure with an inconsistency is depicted in accordance with an advantageous embodiment. In this illustrative example, ceramic structure 1300 may have inconsistency 1302. Inconsistency 1302 may be, for example, delamination of a number of layers or a de-bonding of a number of layers from a substrate. Of course, other types of inconsistencies may be identified in these examples.

Figure 14:
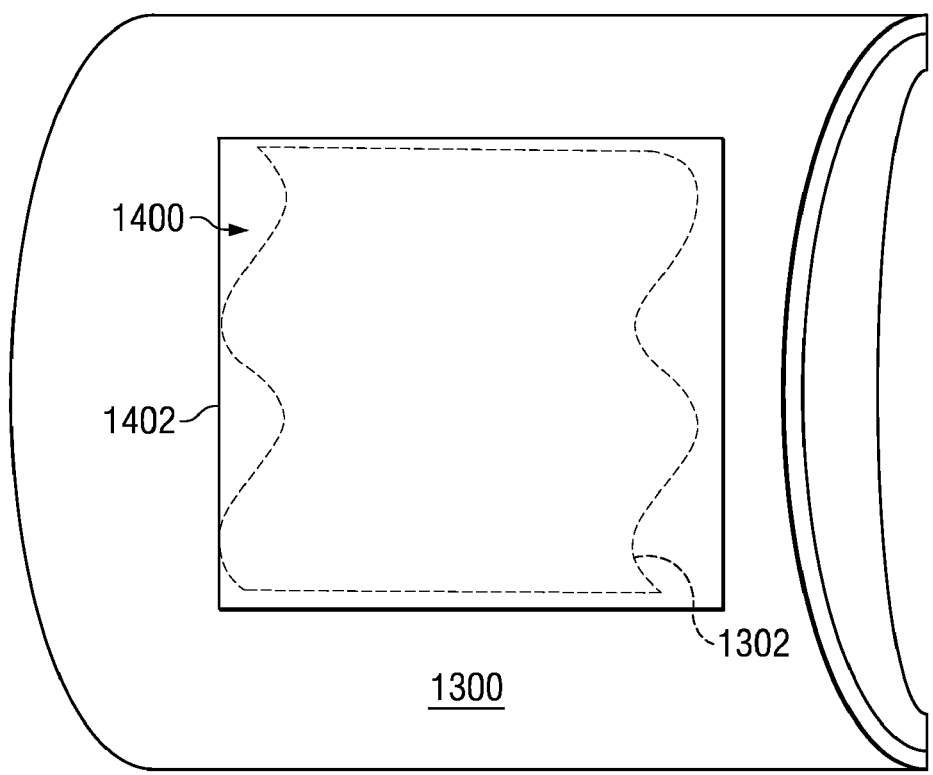
FIG. 14 is a diagram illustrating masking of a ceramic structure in accordance with an advantageous embodiment.

With reference now to FIG. 14, a diagram illustrating taping of a ceramic structure is depicted in accordance with an advantageous embodiment. In this example, area 1400 has been covered using tape 1402. Area 1400 is an area encompassing inconsistency 1302.

Figure 15:
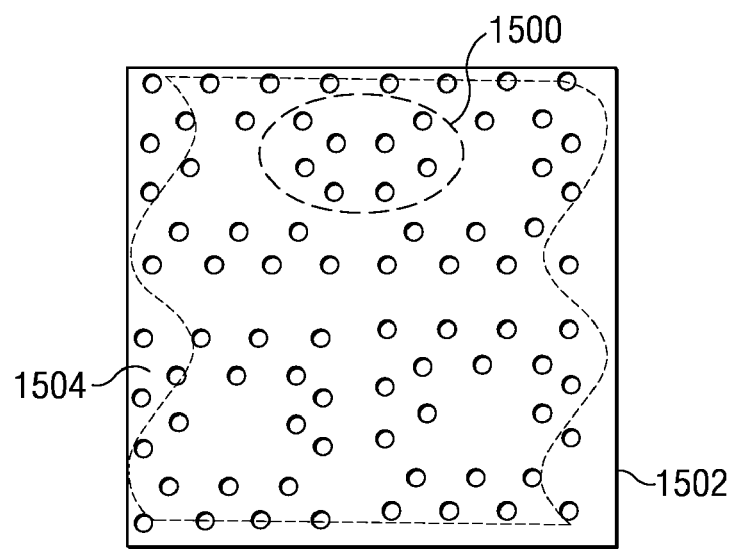
FIG. 15 is a diagram illustrating preparing an area for rework in accordance with an advantageous embodiment.

Turning now to FIG. 15, a diagram illustrating preparing an area for rework is depicted in accordance with an advantageous embodiment. In this depicted example, number of holes 1500 have been drilled through tape 1402 into portion 1502 of ceramic structure 1300 with inconsistency 1302 within area 1400. Portion 1502 is a three-dimensional volume containing inconsistency 1302. In these examples, number of holes 1500 may be within and around area 1400 on surface 1504 of inconsistency 1302. These holes may be around the periphery of inconsistency 1302.

Figure 16:
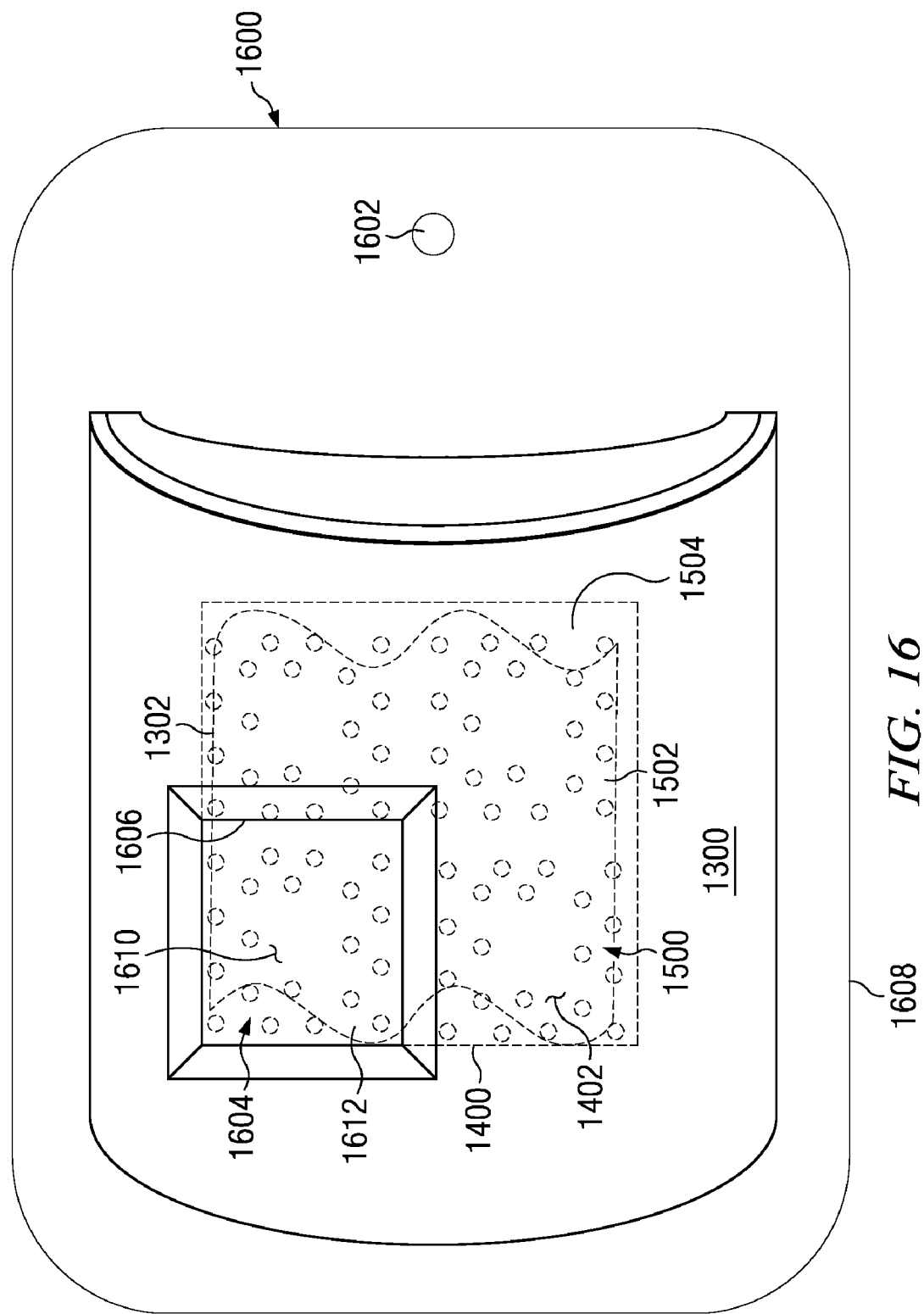
FIG. 16 is a diagram illustrating preparing an inconsistency for introduction of a ceramic bonding material in accordance with an advantageous embodiment.

With reference now to FIG. 16, a diagram illustrating preparing an inconsistency for introduction of a ceramic bonding material is depicted in accordance with an advantageous embodiment. In this example, vacuum bag 1600 is placed onto surface 1504. Vacuum bag 1600 may have vacuum port 1602. Further, vacuum bag 1600 may be secured to surface 1504. In this illustrative example, section 1604 remains exposed.

Edges 1606 of section 1604 are sealed. Additionally, tape 1610 may be used to cover number of holes 1500 in these examples. As can be seen in this particular example, only section 1604 of area 1400 is exposed. Other sections remain unexposed and covered by vacuum bag 1600.

The area is divided into smaller sites or sections for purposes of introducing the ceramic bonding material. The size of the smaller sites is around three inches by three inches in these examples. Of course, the area selected may be any area that allows for increased penetration of the ceramic bonding material into the portion where the inconsistency is located.

Figure 17:
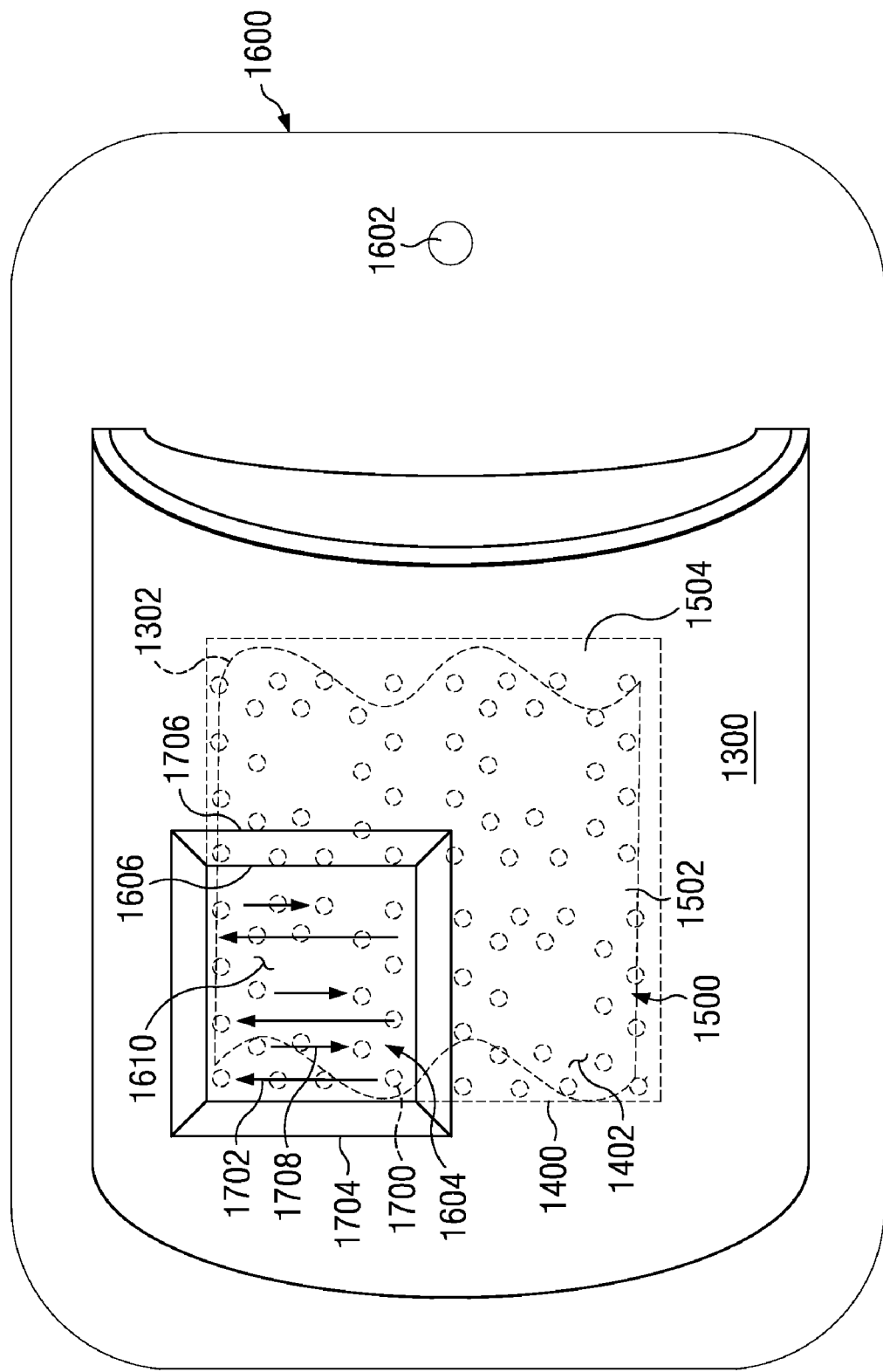
FIG. 17 is a diagram illustrating introduction of a ceramic bonding material into holes within an inconsistency in accordance with an advantageous embodiment.

Turning now to FIG. 17, a diagram illustrating introduction of a ceramic bonding material into holes within an inconsistency is depicted in accordance with an advantageous embodiment. In this example, a ceramic bonding material may be introduced into a portion of number of holes 1500 within section 1604. In this illustrative example, the ceramic bonding material may be introduced starting at point 1700 and may be introduced in the pattern as indicated by arrow 1702 starting at side 1704 and moving toward side 1706. After the holes in section 1604 have been processed, excessive ceramic bonding material may be wiped from the surface, and the holes may be covered with tape.

Figure 18:
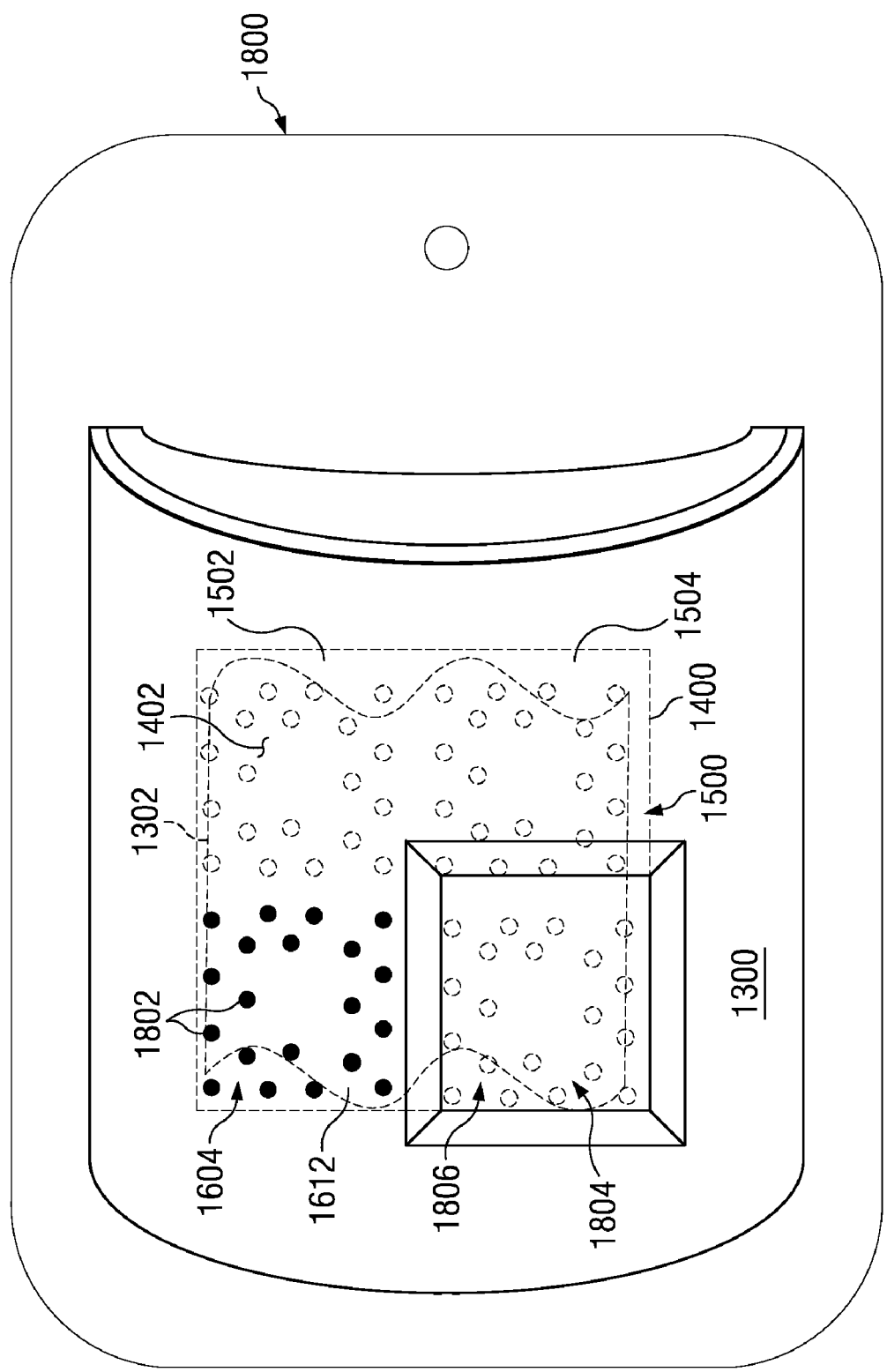
FIG. 18 is a diagram illustrating introduction of a ceramic bonding material into holes within another section of an inconsistency in accordance with an advantageous embodiment.

Turning now to FIG. 18, a diagram illustrating introduction of a ceramic bonding material into holes within another section of an inconsistency is depicted in accordance with an advantageous embodiment. In this illustrative example, vacuum bag 1600 is removed, and vacuum bag 1800 is placed onto surface 1504.

In this example, section 1612 contains processed holes 1802. Vacuum bag 1800 exposes section 1804. Unprocessed holes 1806 in section 1804 may be processed in a similar fashion as discussed above. This process may be repeated until all of the sections containing the number of holes have been processed.

The different examples illustrated for the processes in FIGS. 7-18 have been provided as examples of one manner in which a rework of areas containing inconsistencies may be performed. Some advantageous embodiments may be implemented differently. For example, the rework area is shown to be square in these examples. In other advantageous embodiments, the shape of the rework area may take other forms, such as a rectangle or other suitable form.

Further, in other advantageous embodiments, the size of the rework area used to select between the two advantageous embodiments shown in FIGS. 7-18 may be based on other sizes other than around three inches by three inches. For example, the process illustrated in FIGS. 13-18 may be applied to rework areas having a size of around four inches by four inches.

Figure 19:
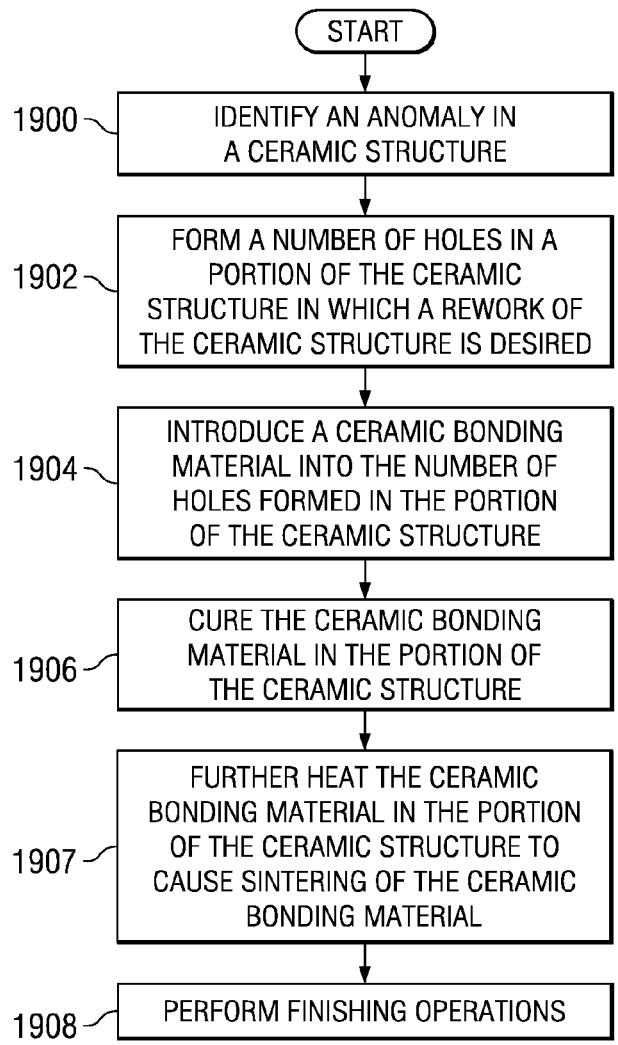
FIG. 19 is a flowchart of a process for reworking a ceramic structure in accordance with an advantageous embodiment.

With reference now to FIG. 19, a flowchart of a process for reworking a ceramic structure is depicted in accordance with an advantageous embodiment. The process illustrated in FIG. 19 may be implemented in rework environment 600 in FIG. 6 in these illustrative examples.

The process begins by identifying an inconsistency in a ceramic structure (operation 1900). The process then forms a number of holes in a portion of the ceramic structure in which a rework of the ceramic structure is desired (operation 1902). In these examples, the ceramic structure has a plurality of layers in which a portion of the rework is desired. This plurality of layers may include, for example, without limitation, a ceramic substrate with a number of layers. The number of layers may be a ceramic matrix composite material.

Next, the process introduces a ceramic bonding material into the number of holes formed in the portion of the ceramic structure (operation 1904). The process cures the ceramic bonding material in the portion of the ceramic structure (operation 1906). Operation 1906 may have multiple curing operations.

A second curing operation may be performed in some embodiments. For example, the curing in operation 1906 may cause the ceramic bonding material in the number of holes to not completely fill the number of holes. In this example, additional ceramic bonding material may be added to completely fill the number of holes, and a second curing operation may be performed.

In other embodiments, the process further heats the ceramic bonding material in the portion of the ceramic structure to cause sintering of the ceramic bonding material (operation 1907). In this operation, another curing operation occurs until a temperature needed for sintering is reached. Sintering of the ceramic bonding material provides cohesion bonding for the ceramic bonding material.

In operation 1907, sintering may be caused at an elevated temperature. For example, sintering of the ceramic bonding material may occur after around two hours at around 1,500 degrees Fahrenheit, around two hours at around 2,200 degrees Fahrenheit, and/or some other suitable period of time and temperature.

Finishing operations may be performed (operation 1908), with the process terminating thereafter. For example, in operation 1908, the surface may be sanded, and/or other suitable finishing operations may be performed. In these examples, the holes may be filled with the ceramic bonding material.

Figure 20:
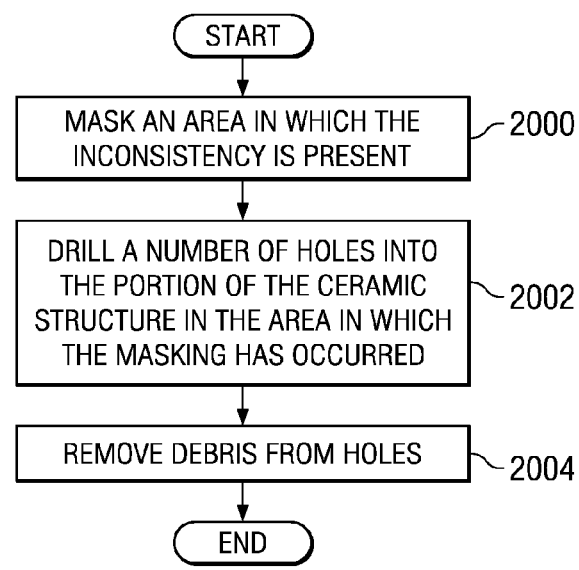
FIG. 20 is a flowchart of a process for forming a number of holes in accordance with an advantageous embodiment.

Turning now to FIG. 20, a flowchart of a process for forming a number of holes is depicted in accordance with an advantageous embodiment. The process illustrated in FIG. 20 is a more-detailed illustration of one manner in which operation 1902 in FIG. 19 may be implemented.

The process begins by masking an area in which the inconsistency is present (operation 2000). In these illustrative examples, this masking may be performed using a tape. In particular, a non-porous release tape may be used.

Thereafter, the process drills a number of holes into the portion of the ceramic structure in the area in which the masking has occurred (operation 2002). In these illustrative examples, the portion may include parts of the ceramic structure below the surface of the area that has been masked off.

The depth to which holes may be drilled may vary, depending on the type of ceramic substrate. For example, if the layers in the ceramic substrate are all formed from a ceramic matrix composite, the depth of the number of holes may be to the depth of the inconsistency. For example, without limitation, if the inconsistency is a number of delaminated plies, the depth through those plies may be identified by the drilling force needed.

Plies that have been delaminated may require less drilling force than plies that are intact. If the ceramic structure is a ceramic matrix composite hybrid in the form of a ceramic substrate with a number of ceramic matrix composite layers, the hole depth may be to the point that the ceramic substrate is reached.

Thereafter, debris is removed from the holes (operation 2004), with the process terminating thereafter. The debris may be removed through the application of pressurized air or a vacuum in these depicted examples.

Figure 21:
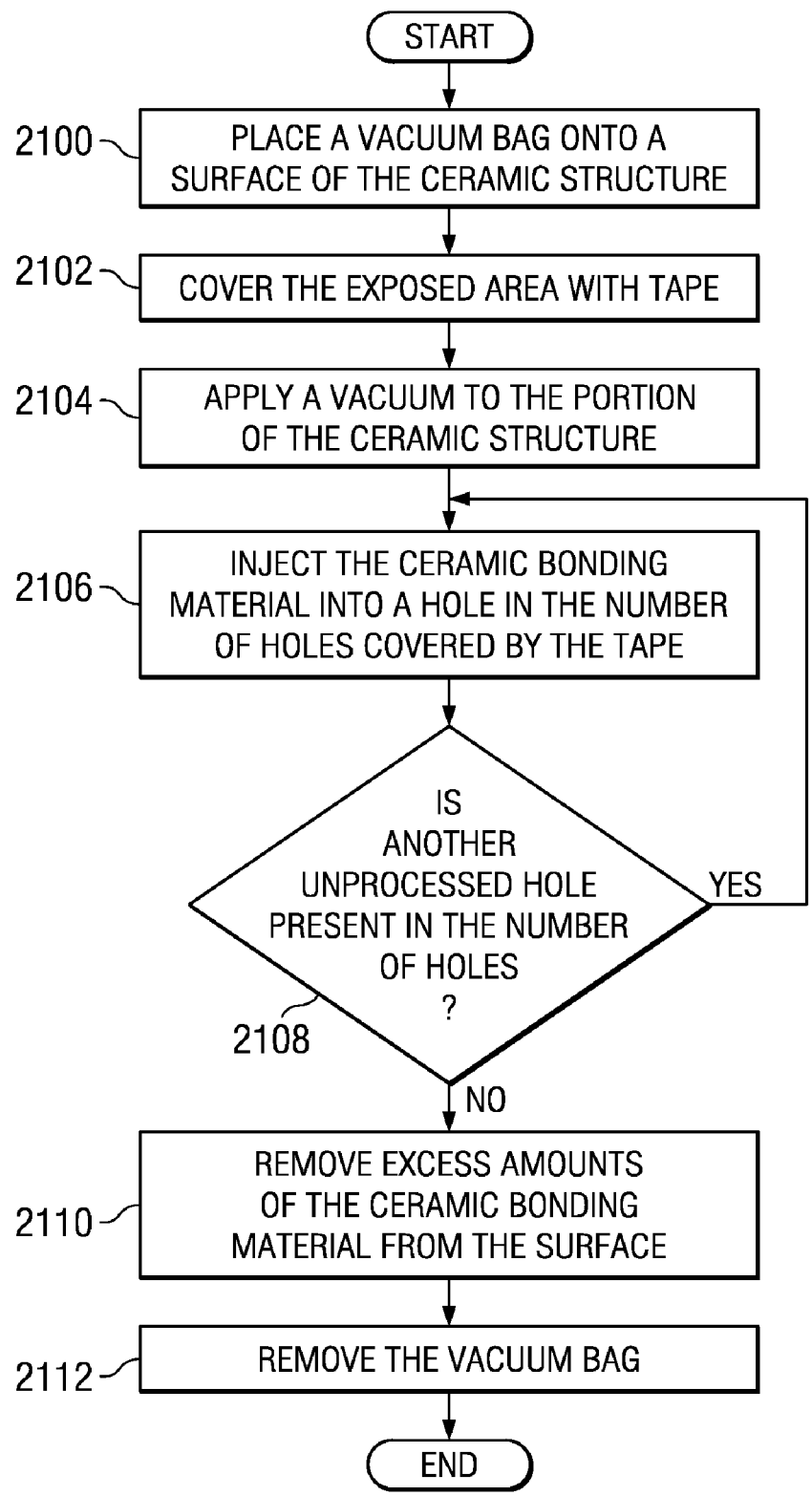
FIG. 21 is a flowchart of a process for introducing a ceramic bonding material into a number of holes in accordance with an advantageous embodiment.

With reference now to FIG. 21, a flowchart of a process for introducing a ceramic bonding material into a number of holes is depicted in accordance with an advantageous embodiment. The process illustrated in FIG. 21 is an example of one manner in which operation 1904 in FIG. 19 may be implemented. In this illustrative example, FIG. 21 is an example of operations used to perform the process illustrated in FIGS. 7-12 and may be applied to rework areas having a size of around three inches by three inches or less.

The process begins by placing a vacuum bag onto a surface of the ceramic structure (operation 2100). The vacuum bag encompasses the number of holes. In these examples, the vacuum bag encompasses the area around the tape that has been used to mask the area containing the inconsistency. In these examples, the vacuum bag leaves the area that has been masked off with the holes exposed.

The exposed area is covered with tape (operation 2102). In these examples, the tape may be a non-porous release tape. In these examples, the tape aids in maintaining a vacuum during the injection of the ceramic bonding material. The vacuum helps the ceramic bonding material flow into the portion of the ceramic structure in which the inconsistency is located.

A vacuum is then applied to the portion of the ceramic structure (operation 2104). Thereafter, the ceramic bonding material is injected into a hole in the number of holes covered by the tape (operation 2106). In operation 2106, the tape is punctured using a device that has an elongate member capable of fitting into the holes to introduce the ceramic bonding material. For example, a needle at the end of a caulking device may be used.

The process then determines whether another unprocessed hole in the number of holes is present for processing (operation 2108). If another unprocessed hole is present for processing, the process returns to operation 2106 as described above. In these illustrative examples, the sequence of injections may begin at a hole furthest away from the vacuum port and may use various patterns, depending on the particular implementation.

After all of the holes have been processed, excess amounts of the ceramic bonding material are removed from the surface (operation 2110). Thereafter, the vacuum bag is removed (operation 2112), with the process terminating thereafter. In operation 2112, the tape covering the number of holes is not removed with the vacuum bag.

The ceramic bonding material may take a number of different forms. For example, the ceramic bonding material may be selected based on the type of ceramic matrix composite material in the ceramic structure. For example, if the ceramic matrix composite material is an oxide, the ceramic bonding material may be, for example, silica, alumina-silica, alumina-mullite, alumina, and/or mullite in a colloidal or powder slurry form. If the ceramic matrix composite material is a non-oxide material, the ceramic bonding material may be, for example, without limitation, silicon carbide pre-ceramic polymer, silicon oxycarbide pre-ceramic polymer, silicon bitride pre-ceramic polymer, silicon oxynitride pre-ceramic polymer, and/or silicon nitride-carbide pre-ceramic polymer in a colloidal or powder slurry form.

Figure 22:
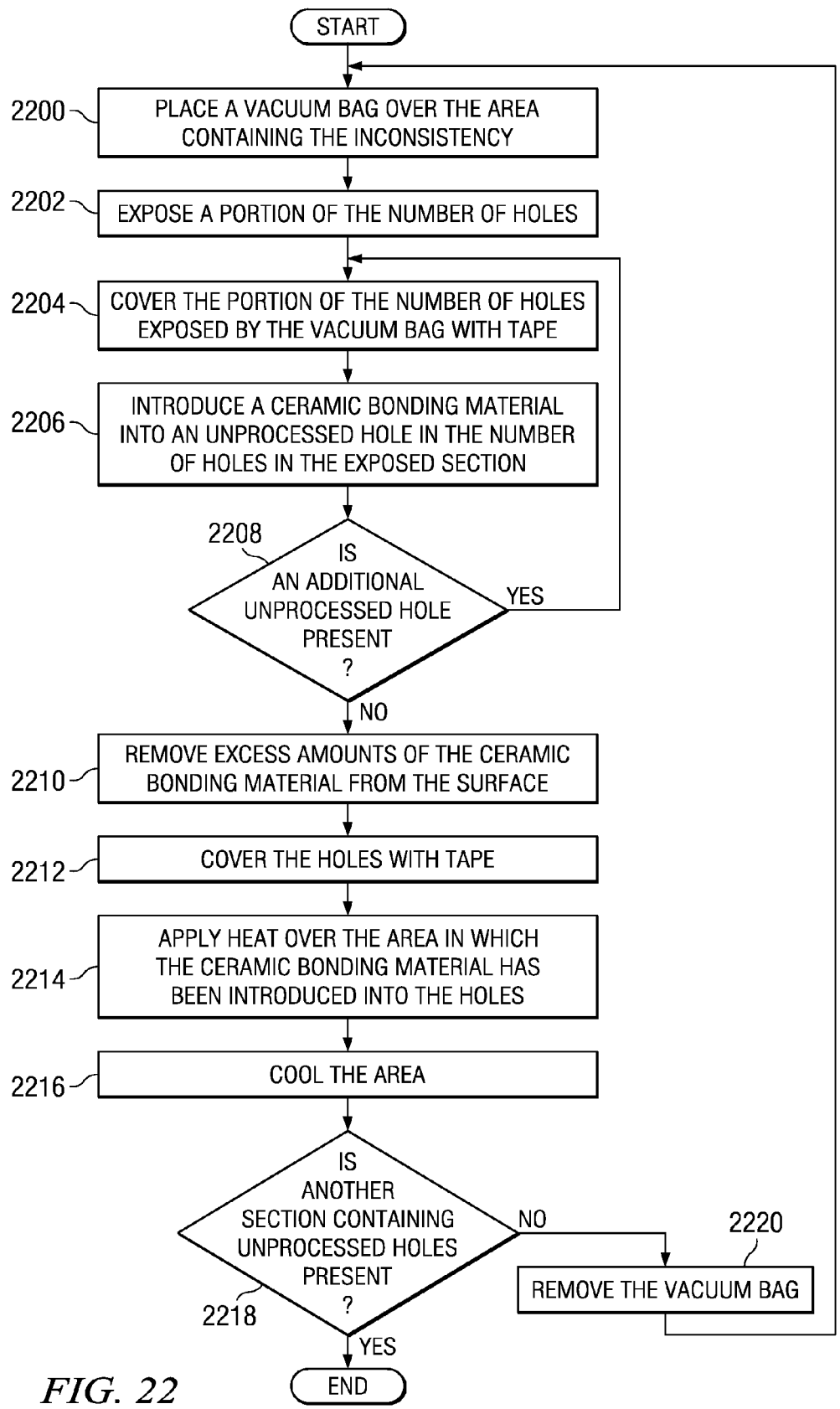
FIG. 22 is a flowchart of a process for introducing a ceramic bonding material into a number of holes in accordance with an advantageous embodiment.

With reference now to FIG. 22, a flowchart of a process for introducing a ceramic bonding material into a number of holes is depicted in accordance with an advantageous embodiment. The process illustrated in FIG. 22 is an example of another manner in which operation 1904 in FIG. 19 may be implemented.

In these illustrative examples, if the area in which the inconsistency is present is large enough, the number of holes may be filled in different sections. The process illustrated in FIG. 22 is an example of steps that may be used to implement the process described with respect to FIGS. 13-18. This process may be applied to rework areas having a size greater than around three inches by three inches in these examples.

The size of the rework area used to select this process may depend on the pot life of the ceramic bonding material. The pot life of the ceramic bonding material is the period of time after mixing the ceramic bonding material until the ceramic bonding material sets up. By breaking the rework area into smaller areas, the ceramic bonding material may be injected into the rework area and cured during the lifespan of this material.

In this illustrative example, a vacuum bag is placed over the area containing the inconsistency (operation 2200). A portion of the number of holes is exposed (operation 2202).

The process then covers the portion of the number of holes exposed by the vacuum bag with tape (operation 2204). Next, the process introduces a ceramic bonding material into an unprocessed hole in the number of holes in the exposed section (operation 2206). In operation 2206, the sequence in which holes are filled may begin at a hole furthest away from the vacuum port.

A determination is made as to whether an additional unprocessed hole is present (operation 2208). If an additional unprocessed hole is present, the process returns to operation 2204.

Otherwise, excess amounts of the ceramic bonding material are removed from the surface (operation 2210). The process then covers the holes with tape (operation 2212).

The process then applies heat over the area in which the ceramic bonding material has been introduced into the holes (operation 2214). This operation may be performed at a temperature of around 100 degrees Fahrenheit to around 300 degrees Fahrenheit for around 30 minutes, while a vacuum continues to be drawn. Thereafter, the process cools the area (operation 2216). In these examples, the area may be cured to an ambient temperature.

A determination is made as to whether another section containing unprocessed holes is present (operation 2218). If another section is not present with unprocessed holes, the vacuum bag is removed (operation 2220), and the process returns to operation 2200. If all of the sections with unprocessed holes have been completed, the process terminates.

Figure 23:
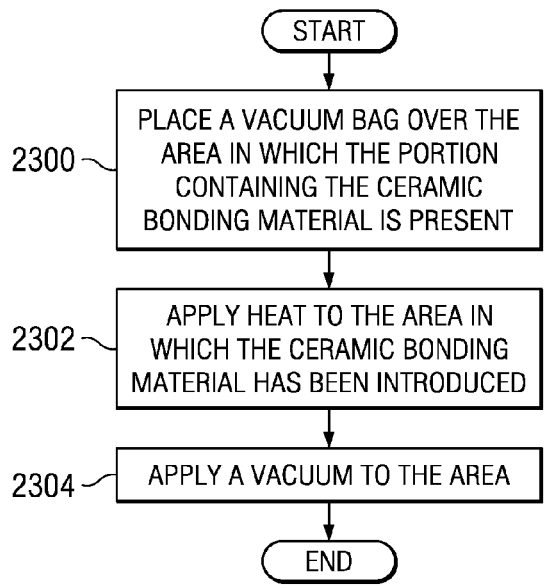
FIG. 23 is a flowchart of a process for curing a ceramic bonding material placed into holes in accordance with an advantageous embodiment.

With reference now to FIG. 23, a flowchart of a process for curing a ceramic bonding material placed into holes is depicted in accordance with an advantageous embodiment. In this illustrative example, the process illustrated in FIG. 23 is an example of one implementation for operation 1906 in FIG. 19. This process may be used as part of a field repair. In other words, the process illustrated in FIG. 23 may be performed while the ceramic structure is on the vehicle. This process also may be used to cure ceramic structures in a manufacturing facility.

The process begins by placing a vacuum bag over the area in which the portion containing the ceramic bonding material is present (operation 2300). The process then applies heat to the area in which the ceramic bonding material has been introduced (operation 2302). In these examples, if the operation is being performed in the field or the ceramic structure is still attached to the platform, heat may be applied using a heat source such as, for example, without limitation, a heat lamp, a blanket, and/or some other suitable heat source.

The amount of heat, the manner in which the heat is applied, and the time for which the heat is applied, as well as other parameters, may be selected based on the type of ceramic bonding material that is used. If operation 2302 is performed in a manufacturing facility, the heat may be applied by placing the ceramic structure in an autoclave or oven.

The process applies a vacuum to the area (operation 2304), with the process terminating thereafter. This vacuum may be applied using a vacuum system. In these illustrative examples, the heat in operation 2302 is applied while the vacuum is applied in operation 2304. The vacuum may be applied prior to the heat being applied. The heat may be applied first, or both the heat and the vacuum may be applied at the same time. Pressure and vacuum may be applied when an autoclave is used in these examples.

The process illustrated in FIG. 23 may be repeated to provide additional curing of the ceramic bonding material. The parameters for heating the ceramic bonding material may vary, depending on the particular type of ceramic structure. An example of some parameters for curing a ceramic bonding material includes around two hours at around 180 degrees Fahrenheit, around one hour at around 250 degrees Fahrenheit, around one hour at around 350 degrees Fahrenheit, and any other suitable period of time and temperature for the particular type of ceramic bonding material. The particular profile used depends on the material.

These and other profiles may be used to cure the ceramic bonding material a second time. The profile may change, depending on the particular material selected. The second heating may be performed in a furnace. Also, with field rework, this curing may be performed using a heat source on the platform if the ceramic structure is located on the platform. For example, an engine or power generator may generate sufficient heat needed to perform this curing process.

Figure 24:
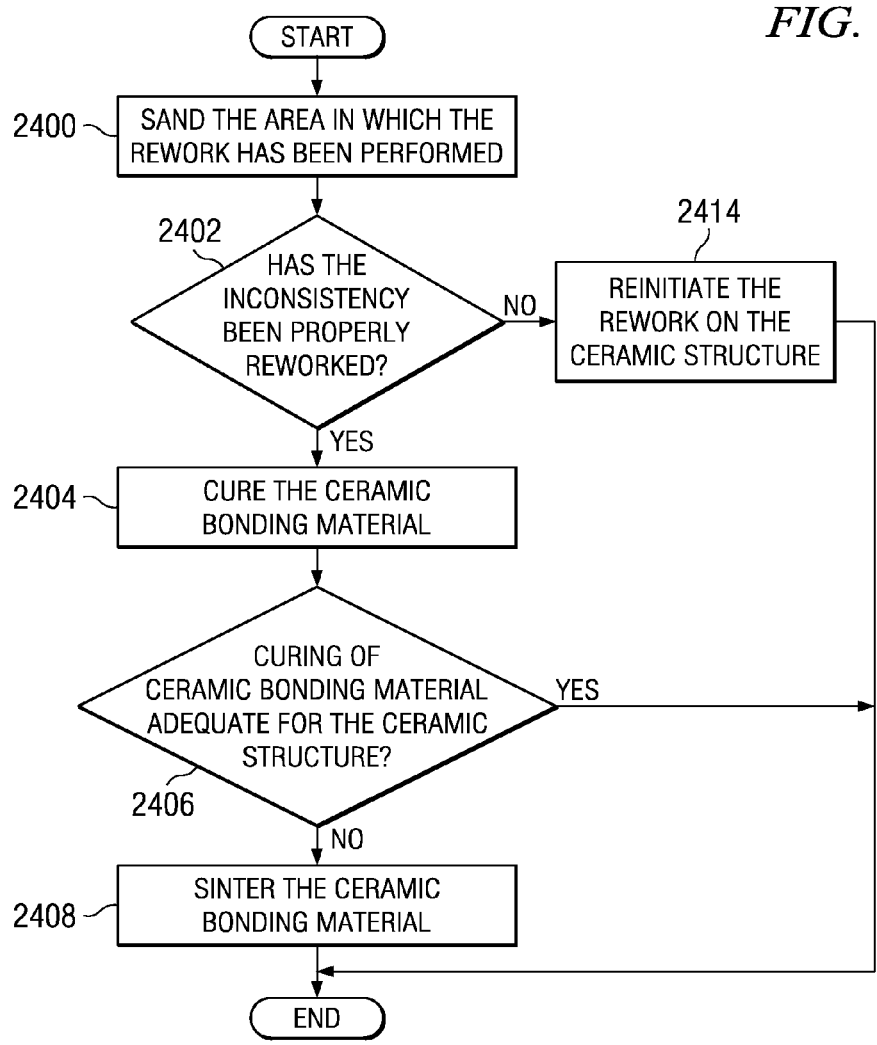
FIG. 24 is a flowchart of a process for completing processing of a reworked part in accordance with an advantageous embodiment.

With reference now to FIG. 24, a flowchart of a process for completing processing of a reworked ceramic structure is depicted in accordance with an advantageous embodiment. The process begins by sanding the area in which the rework has been performed (operation 2400). The sanding may place the surface back to a desired finish and/or desired level of flushness with respect to the original surface. A determination is then made as to whether the inconsistency has been properly reworked (operation 2402).

If the inconsistency has been reworked to an acceptable level, the ceramic bonding material is cured (operation 2404). A determination is then made as to whether curing of the ceramic bonding material is adequate for the ceramic structure (operation 2406). If the curing of the ceramic bonding material is adequate, the process terminates. Otherwise, the process sinters the ceramic bonding material (operation 2408), with the process terminating thereafter. In operation 2408, the ceramic bonding material is sintered by heating the ceramic bonding material at an elevated temperature.

If the repair is being performed in the field, the sintering in operation 2408 may be caused by operation of the platform on which the ceramic structure is located. In one illustrative example, if a repair is performed on an engine exhaust nozzle in the field, operation of the engine is sufficient to cause sintering of the ceramic bonding material that may be used to repair the engine exhaust nozzle. However, if the repair is not performed in the field, the sintering in operation 2408 may be performed using a furnace, an autoclave, an oven, and/or some other suitable heating system.

The sintering may be performed for around two hours at around 1,500 degrees Fahrenheit, around two hours at around 2,200 degrees Fahrenheit, and/or some other suitable temperature and period of time.

With reference again to operation 2404, if the rework is not being performed in the field, the reworked ceramic structure is cured (operation 2412), with the process terminating thereafter.

With reference again to operation 2402, if the rework is not acceptable, the process may then reinitiate the rework on the ceramic structure (operation 2414). Operation 2414 may involve reinitiating the operations in FIG. 19.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method for reworking ceramic structures. In the different advantageous embodiments, a number of holes may be formed in a portion of a ceramic structure in which a rework of the ceramic structure is desired. This ceramic structure has a plurality of layers in the portion in which the rework is desired. A ceramic bonding material is introduced into the number of holes formed in the portion of the ceramic structure. The ceramic bonding material is cured in the portion of the ceramic structure.

As a result, one or more of the different advantageous embodiments provide a capability to rework inconsistencies in a manner that may not cause additional inconsistencies. This process allows for reworking ceramic structures rather than replacing the structures with new ones. As a result, the time and expense needed for obtaining new ceramic structures may be reduced and/or eliminated.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to ceramic structures in spacecraft, the advantageous embodiments may be applied for use with ceramic structures used with other types of platforms.

For example, the different advantageous embodiments may be used to rework ceramic structures for platforms such as, for example, without limitation, a mobile platform, a stationary platform, a land-based structure, an aquatic-based structure, a space-based structure, an aircraft, an engine, a tank, a space station, a satellite, a submarine, an automobile, and/or other suitable platforms.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reworking a ceramic structure, the method comprising:

forming a number of holes in a portion of the ceramic structure in which a rework of the ceramic structure is desired, wherein the ceramic structure has a plurality of layers in the portion in which the rework is desired;

securing a vacuum bag around a first part of a surface around the number of holes in which the vacuum bag has an opening exposing a subset of the number of holes in a second part of the surface;

placing a tape over the subset of the number of holes in the second part of the surface exposed in the opening;

applying a vacuum through the vacuum bag;

introducing a ceramic bonding material under pressure into the number of holes through the tape; and curing the ceramic bonding material in the portion of the ceramic structure.

2. The method of claim 1, wherein the steps of securing the vacuum bag around the first part of the surface around the number of holes in which the vacuum bag has the opening exposing the subset of the number of holes in the second part of the surface, placing the tape over the subset of holes in the second part of the surface exposed in the opening, applying the vacuum through the vacuum bag, and introducing the ceramic bonding material under the pressure into the number of holes through the tape are repeated until the ceramic bonding material has been introduced into all of the number of holes.

3. The method of claim 1, further comprising:

removing the ceramic structure from a platform on which the structure is used prior to forming the number of holes.

4. The method of claim 1, wherein the ceramic structure is a ceramic matrix composite structure.

5. The method of claim 1, wherein the ceramic structure comprises:

a ceramic substrate; and a number of layers of a ceramic matrix composite material wrapped around the ceramic substrate.

6. The method of claim 1, wherein the ceramic bonding material comprises:

a solution; and polymers configured to form a ceramic material when cured, wherein the polymers are suspended in the solution.

7. The method of claim 1, wherein the ceramic bonding material is selected from one of a ceramic precursor and an adhesive.

8. The method of claim 1, wherein the ceramic structure is for use with a platform from one of a mobile platform, a stationary platform, a land-based structure, an aquatic-based structure, a space-based structure, an aircraft, an engine, a tank, a spacecraft, a space station, a satellite, a submarine, and an automobile.

9. A method for reworking a ceramic structure, the method comprising:

forming a number of holes in a portion of the ceramic structure in which a rework of the ceramic structure is desired, wherein the ceramic structure has a plurality of layers formed from a ceramic matrix composite material;

placing a vacuum bag over the portion of the ceramic structure, wherein the vacuum bag has an opening exposing the number of holes;

covering the number of holes exposed in the opening with a tape;

applying a vacuum to the portion through the vacuum bag;

introducing a ceramic bonding material through the tape into the number of holes formed in the portion of the ceramic structure while the vacuum is being applied; and curing the ceramic bonding material in the portion of the ceramic structure for a period of time after the ceramic bonding material has been introduced into the number of holes while the vacuum is being applied.

10. The method of claim 9, wherein the period of time is a first period of time and further comprising:

curing the ceramic bonding material for a second period of time using heat generated by a heat source located on a platform on which the ceramic structure is used, wherein the heat is generated by the heat source during an operation on the platform.

11. The method of claim 10 further comprising:

sintering the ceramic bonding material during a portion of the second period of time.

12. The method of claim 9, wherein the vacuum is applied in a manner that creates a force that pushes the plurality of layers onto the ceramic structure.

13. The method of claim 9, wherein the ceramic bonding material is selected from one of a ceramic precursor and an adhesive.

14. The method of claim 9, wherein the ceramic structure is associated with a platform and the platform is selected from one of a mobile platform, a stationary platform, a land-based structure, an aquatic-based structure, a space-based structure, an aircraft, a space station, an engine, a tank, a spacecraft, a satellite, a submarine, and an automobile.

15. A method for reworking a ceramic structure, the method comprising:

forming holes in a portion of the ceramic structure in which a rework of the ceramic structure is desired, wherein the ceramic structure has a plurality of layers formed from a ceramic matrix composite material;

placing a vacuum bag over the portion of the ceramic structure, wherein the vacuum bag has an opening exposing a subset of the holes;

covering the subset of the holes exposed in the opening with a tape;

applying a vacuum to the portion through the vacuum bag;

introducing a ceramic bonding material through the tape into the subset of the holes exposed in the opening while the vacuum is being applied;

heating the ceramic bonding material in the portion of the ceramic structure for a period of time after the ceramic bonding material has been introduced into the subset of the holes while the vacuum is being applied; and repeating the steps of placing the vacuum bag over the portion of the ceramic structure, wherein the vacuum bag has the opening exposing the subset of the holes; covering the subset of the holes exposed in the opening with the tape; applying the vacuum to the portion through the vacuum bag; introducing the ceramic bonding material through the tape into the subset of the holes while the vacuum is being applied; and heating the ceramic bonding material in the portion of the ceramic structure for the period of time after the ceramic bonding material has been introduced into the subset of the holes while the vacuum is being applied for a different subset of the holes until all of the holes have been processed.

16. The method of claim 15 further comprising:

curing the ceramic bonding material in the portion of the ceramic structure for the period of time after the ceramic bonding material has been introduced into the subset of the holes while the vacuum is being applied.

* * * * *